(12) United States Patent
Riggert et al.

(10) Patent No.: US 11,213,039 B2
(45) Date of Patent: Jan. 4, 2022

(54) HOLDING DEVICE FOR HOLDING EVISCERATED POULTRY CARCASSES OR PARTS THEREOF DURING PROCESSING IN A DEVICE FOR PROCESSING EVISCERATED POULTRY CARCASSES OR PARTS THEREOF

(71) Applicant: Nordischer Maschinenbau Rud. Baader GmbH + Co. KG, Lübeck (DE)

(72) Inventors: Lasse Riggert, Scharbeutz (DE); Matthias Schröder, Stockelsdorf (DE); Adrian Schulze, Lübeck (DE)

(73) Assignee: Nordischer Maschinenbau Rud. Baader GmbH + Co. KG, Lübeck (DE)

( * ) Notice: Subject to any disclaimer, the term of this patent is extended or adjusted under 35 U.S.C. 154(b) by 0 days.

(21) Appl. No.: 16/964,131

(22) PCT Filed: Jan. 16, 2019

(86) PCT No.: PCT/EP2019/051044
§ 371 (c)(1),
(2) Date: Jul. 22, 2020

(87) PCT Pub. No.: WO2019/145203
PCT Pub. Date: Aug. 1, 2019

(65) Prior Publication Data
US 2021/0030012 A1    Feb. 4, 2021

(30) Foreign Application Priority Data
Jan. 26, 2018   (EP) .................................... 18153614

(51) Int. Cl.
*A22C 21/00*      (2006.01)

(52) U.S. Cl.
CPC ...... *A22C 21/0053* (2013.01); *A22C 21/0046* (2013.01)

(58) Field of Classification Search
CPC . A22C 21/00; A22C 21/0015; A22C 21/0053; A22C 21/003; A22C 21/06
(Continued)

(56) References Cited

U.S. PATENT DOCUMENTS

| 4,716,624 A | 1/1988 | Massey, Jr. |
| 5,045,024 A | 9/1991 | Diesing |

(Continued)

FOREIGN PATENT DOCUMENTS

| CN | 103826460 A | 5/2014 |
| EP | 0401528 A2 | 12/1990 |

(Continued)

OTHER PUBLICATIONS

International Search Report dated Mar. 8, 2019; International Application No. PCT/EP2019/051044.

*Primary Examiner* — Richard T Price, Jr.
(74) *Attorney, Agent, or Firm* — Dinsmore & Shohl LLP

(57) ABSTRACT

A holding apparatus is configured and adapted for holding eviscerated poultry bodies or parts thereof during processing in a processing apparatus. The holding apparatus includes a supporting body, a fastening body for holding the supporting body and for fastening the holding apparatus to a revolving transport unit of the processing apparatus, and also a clamping device for fixing the poultry body or parts on the supporting body. The supporting body is detachably connected to the fastening body by a fastening element. The fastening element, in the mounted state of the holding apparatus, is accessible from outside. At least one stationary supporting bolt and at least one movable guide bolt are arranged on the fastening body, and the supporting body has (Continued)

corresponding recesses into which the bolts engage. A transport apparatus, a processing apparatus, and a method for maintenance of a holding apparatus, are also provided.

13 Claims, 7 Drawing Sheets

(58) Field of Classification Search
USPC .............. 452/177–180, 185, 187, 106, 107
See application file for complete search history.

(56) References Cited

U.S. PATENT DOCUMENTS

| | | | |
|---|---|---|---|
| 5,951,393 A | 9/1999 | Barendregt | |
| 6,837,782 B2* | 1/2005 | Hetterscheid | A22C 21/0053 452/179 |
| 7,614,941 B2* | 11/2009 | van den Nieuwelaar | A22C 21/0092 452/185 |
| 8,678,887 B2* | 3/2014 | Evers | A22C 21/0046 452/194 |
| 9,173,413 B2 | 11/2015 | Peters et al. | |
| 2009/0275275 A1 | 11/2009 | Evers | |
| 2021/0030012 A1* | 2/2021 | Riggert | A22C 21/0046 |

FOREIGN PATENT DOCUMENTS

| | | |
|---|---|---|
| EP | 3062620 A1 | 9/2016 |
| WO | 2008022787 A1 | 2/2008 |

* cited by examiner

HOLDING DEVICE FOR HOLDING EVISCERATED POULTRY CARCASSES OR PARTS THEREOF DURING PROCESSING IN A DEVICE FOR PROCESSING EVISCERATED POULTRY CARCASSES OR PARTS THEREOF

CROSS-REFERENCE TO RELATED APPLICATIONS

This application is the U.S. national stage of PCT/EP2019/051044 filed Jan. 16, 2019, which claims priority of European Patent Application 18153614.5 filed Jan. 26, 2018 both of which are hereby incorporated by reference in their entirety.

FIELD OF THE INVENTION

The invention relates to a holding apparatus, configured and adapted for holding eviscerated poultry bodies or parts thereof during processing in an apparatus for processing eviscerated poultry bodies or parts thereof, comprising a supporting body configured and adapted for supporting the poultry body or parts thereof, a fastening body configured and adapted for holding the supporting body on the one hand and for fastening the holding apparatus to a revolving transport unit of the apparatus for processing eviscerated poultry bodies or parts thereof on the other hand, and also a clamping device for fixing the poultry body or parts thereof on the supporting body during processing.

The invention relates further to a transport apparatus, configured and adapted for transporting eviscerated poultry bodies or parts thereof, comprising a revolvingly driven transport unit and at least one holding apparatus fastened thereto, which holding apparatus is configured and adapted for holding the eviscerated poultry bodies or parts thereof during processing in an apparatus for processing eviscerated poultry bodies or parts thereof.

The invention relates further to the use of a transport apparatus in an apparatus for processing eviscerated poultry bodies or parts thereof.

The invention is further directed to an apparatus for processing eviscerated poultry bodies or parts thereof, which apparatus comprises at least one processing station for processing the poultry bodies or parts thereof and also a transport apparatus for transporting the poultry bodies or parts thereof along the or each processing station.

Finally, the invention relates to a method for the maintenance of a holding apparatus which is configured and adapted for holding eviscerated poultry carcasses or parts thereof during processing in an apparatus for processing eviscerated poultry bodies or parts thereof, wherein the holding apparatus comprises a fastening body, with which the holding apparatus is fastened to a transport unit of the apparatus for processing, and a supporting body which is detachably arranged on the fastening body and is configured and adapted for supporting poultry bodies or parts thereof.

BACKGROUND OF THE INVENTION

In the poultry processing industry, eviscerated poultry bodies or parts thereof are processed in corresponding apparatuses. Conventionally, multiple holding apparatuses are fastened to a revolving transport unit by means of which the poultry bodies or parts thereof are conveyed to, or brought into the operating region of, one or more processing stations. For processing, the poultry bodies or parts thereof are saddled and fixed on the holding apparatus. During processing, the holding apparatuses and the transport apparatus as a whole naturally become heavily contaminated. For maintenance of the holding apparatuses, the apparatus for processing must be put out of operation. Maintenance is understood as meaning, inter alia, repair, the replacement of single parts and in particular also the cleaning of the apparatus and of single parts thereof. Specifically, the cleaning of the apparatus for processing and in particular of the holding apparatuses and also of the transport apparatuses is particularly important in order to comply with existing hygiene regulations. For safe and reliable cleaning of the holding apparatuses, the supporting body must be detached from the fastening body so that the two bodies can be conveyed to different cleaning processes and/or cleaning media and, in particular, the region beneath the supporting body as well as the fastening body having the clamping device can also be cleaned effectively.

In the holding apparatuses known hitherto, which are also referred to as transport saddles, the supporting body is detachably connected to the fastening body. The fastening body thereby forms the so-called saddle mechanism, which also comprises the clamping device. The supporting body is known as the saddle. However, in order to be able to detach the supporting body from the fastening body, the entire holding apparatus must be detached from the transport unit. In known designs, the supporting body can be separated from the fastening body only if the unit as a whole is removed from the transport unit. On the one hand this has the result that, for maintenance, all the connections of the holding apparatuses to the transport unit must first be released, which is complex and time-consuming. However, not only do the holding apparatuses have to be completely dismantled, they must also be properly mounted again after cleaning. Maintenance thus causes long stoppage times of the apparatus for processing, which leads to a loss of productivity of the apparatus. A further disadvantage is that, for maintenance, the known holding apparatuses can be handled only with difficulty because of their high weight.

SUMMARY OF THE INVENTION

Accordingly, the object underlying the invention is to provide a simple holding apparatus that is easy to maintain. A further object of the invention is to provide a transport apparatus and apparatus for processing eviscerated poultry bodies or parts thereof that is easy to maintain. The object consists further in proposing a simple and reliable method for maintaining holding apparatuses.

This object is achieved by a holding apparatus of the type mentioned hereinbefore in that the supporting body is detachably connected to the fastening body by means of a fastening means, wherein the fastening means is so configured and adapted that, in the mounted state of the holding apparatus on the transport unit, it is accessible from outside for detaching the supporting body from the fastening body, wherein there are arranged on the fastening body at least one stationary supporting bolt and at least one movable guide bolt, wherein the supporting body has corresponding recesses into which the stationary supporting bolt and the movable guide bolt engage. This means that, when the machine is stopped, the supporting body can easily be detached from the fastening body, while the fastening body can remain permanently on the transport unit, or in the apparatus. Thus, on the one hand, the fastening body no longer has to be detached from the transport unit in a complex operation. The dismantling and mounting of the supporting body is thereby substantially facilitated. Since apparatuses for processing conventionally have a plurality of holding apparatuses, the effect is considerable. The comparatively lightweight supporting bodies are easy for the operating personnel to handle and can be conveyed to effective cleaning. The fastening bodies including the clamping device can be cleaned in the installed state within the apparatus. In short, cleaning of the supporting body is facilitated by simply removing the supporting body from and fitting it to the fastening body and creates the possibility of cleaning the fastening body in the apparatus (CIP=clean in place).

A particularly preferred further development of the invention is characterised in that the supporting body is connected to the fastening body by means of a quick-action locking system, which is accessible from outside, as the fastening means. As a result of this form, the supporting body can be detached and re-fitted particularly simply and quickly with just one turn of the hand, whereby the above-mentioned advantages are enhanced.

Advantageously, the quick-action locking system comprises bolts on the fastening body on the one hand and recesses on the supporting body on the other hand, which bolts and recesses engage with one another in a positive-locking and/or non-positive locking manner. This creates a particularly simple and secure fastening means which on the one hand is easy to handle and on the other hand ensures that the supporting body is held securely on the fastening body.

Expediently, at least two supporting bolts are arranged in a stationary manner on the fastening body, which supporting bolts each extend on either side of the fastening body, and the at least one movable guide bolt likewise extends on both sides of the fastening body. This asymmetrical form of the fastening means on the one hand optimises the removal and fitting of the supporting body easily and without jamming and on the other hand ensures a secure and stable connection between the supporting body and the fastening body.

A preferred further development is characterised in that the movable guide bolt is arranged on an actuating lever, wherein the actuating lever on the one hand is movably mounted on the fastening body and on the other hand is arranged in a spring-loaded manner on the fastening body. With the actuating lever, which is accessible from outside, that is to say in the mounted state, and the pre-tensioning thereof against a spring force, the detachment and fastening of the supporting body is particularly simple.

Preferably, the movable guide bolt is fixedly connected to the actuating lever and extends on either side of the actuating lever, wherein the free ends of the guide bolt are guided in elongated holes on the fastening body. This embodiment ensures simple and secure detachment and fastening of the supporting body to the fastening body.

Optionally, the unit formed of the fastening body and the clamping device is made of metal, preferably of stainless steel. Alternatively, the unit can also be made of other materials which are permitted in the foodstuffs industry. Material combinations of metal and plastics material can also be used. However, the stainless-steel variant has a particularly long service life and can be cleaned simply and effectively.

Advantageously, the supporting body is in one-part form and is made of plastics material. Since the outer contour of the supporting body is adapted at least in part to the inner contour of the poultry or parts thereof, the supporting body can be implemented particularly simply and inexpensively as a one-part plastics part. Further preferably, the supporting body is produced by the injection moulding method, by milling from the solid or by means of 3D printing.

The object is also achieved by a transport apparatus of the type mentioned hereinbefore in that the or each holding apparatus is configured and adapted as disclosed herein.

The object is further achieved in that, when a transport apparatus is used in an apparatus for processing eviscerated poultry bodies or parts thereof, a transport apparatus as described herein is used.

The object is also achieved by an apparatus for processing eviscerated poultry bodies or parts thereof of the type mentioned hereinbefore in that the transport apparatus is configured and adapted as disclosed herein.

The object is further achieved by a method having the steps mentioned hereinbefore in that, for maintenance of the holding apparatus, only the supporting body is removed from the fastening body, while the fastening body remains on the transport unit.

Preferably, the supporting body is detached from the fastening body by actuation of a quick-action locking system which, in the mounted state of the holding apparatus on the transport unit, is accessible from outside.

The advantages which arise from the transport apparatus according to the invention, the use thereof, the apparatus for processing eviscerated poultry bodies or parts thereof and the method for maintenance of the holding apparatus have already been described in detail in connection with the holding apparatus, so that, in order to avoid repetition, reference is made to the corresponding passages.

BRIEF DESCRIPTION OF THE DRAWINGS

Further expedient and/or advantageous features and further developments of the holding apparatus, of the transport apparatus, of the use, of the apparatus for processing eviscerated poultry bodies or parts thereof and of the method for maintenance of the holding apparatus will become apparent from the dependent claims and the description. Particularly preferred embodiments of the apparatus will be explained in greater detail with reference to the accompanying drawing, in which:

DETAILED DESCRIPTION OF THE PREFERRED EMBODIMENTS

Figure 1:
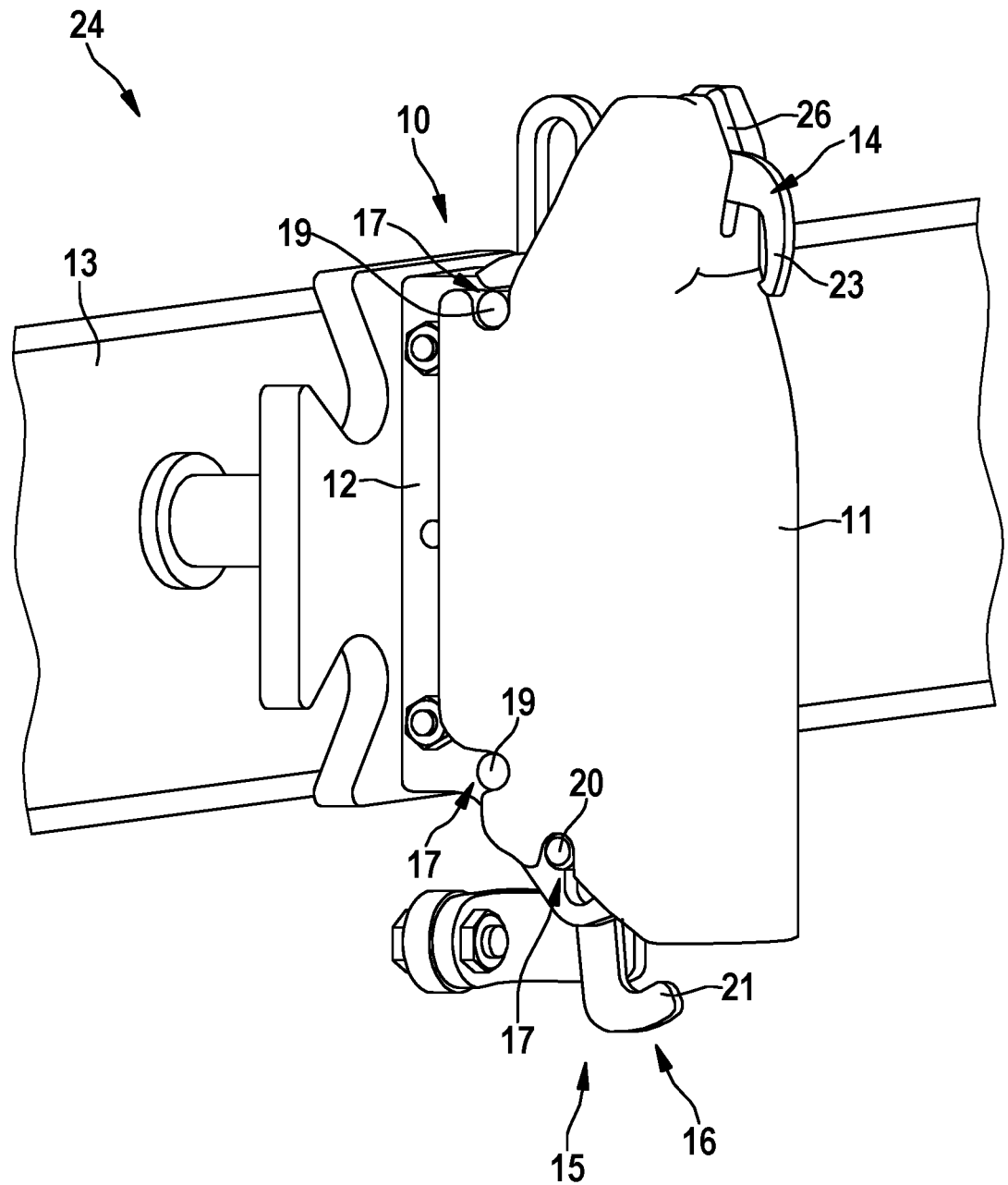
FIG. 1 is a schematic representation of a holding apparatus in a perspective view, wherein the supporting body is connected to the fastening body and the fastening body is connected to the transport unit.

The holding apparatus shown in the drawing serves to hold poultry breast caps. The holding apparatus according to the invention is, however, also configured and adapted for holding further poultry parts.

The holding apparatus 10 shown is configured and adapted for holding eviscerated poultry bodies or parts thereof during processing in an apparatus for processing eviscerated poultry bodies or parts thereof. The holding apparatus 10 comprises a supporting body 11 which is configured and adapted for supporting the poultry carcass or parts thereof. The holding apparatus 10 further comprises a fastening body 12 which is configured and adapted for holding the supporting body 11 on the one hand and for fastening the holding apparatus 10 to a revolving transport unit 13 of the apparatus for processing eviscerated poultry bodies or parts thereof on the other hand. The holding apparatus 10 also comprises a clamping device 14 for fixing the poultry body or parts thereof to the supporting body 11 during processing.

This holding apparatus 10 is distinguished according to the invention in that the supporting body 11 is detachably connected to the fastening body 12 by means of a fastening means 15, wherein the fastening means 15 is so configured and adapted that, in the mounted state of the holding apparatus 10 on the transport unit 13, it is accessible from outside for detaching the supporting body 11 from the fastening body 12, wherein there are arranged on the fastening body 12 at least one stationary supporting bolt 19 and at least one movable guide bolt 20, wherein the supporting body 11 has corresponding recesses 18 into which the stationary supporting bolt 19 and the movable guide bolt 20 engage. It is thus possible for an operator to actuate the fastening means 15—manually and/or with a tool—and thus remove the supporting body 11 from the fastening body 12 when the fastening means 12 is connected to the transport unit 13.

The features and further developments described in the following represent preferred embodiments on their own or in combination with one another. It is expressly pointed out that features that are combined or described in a common embodiment in the claims and/or the description and/or the drawing can also further develop the holding apparatus 10 described above functionally independently.

Figure 6:
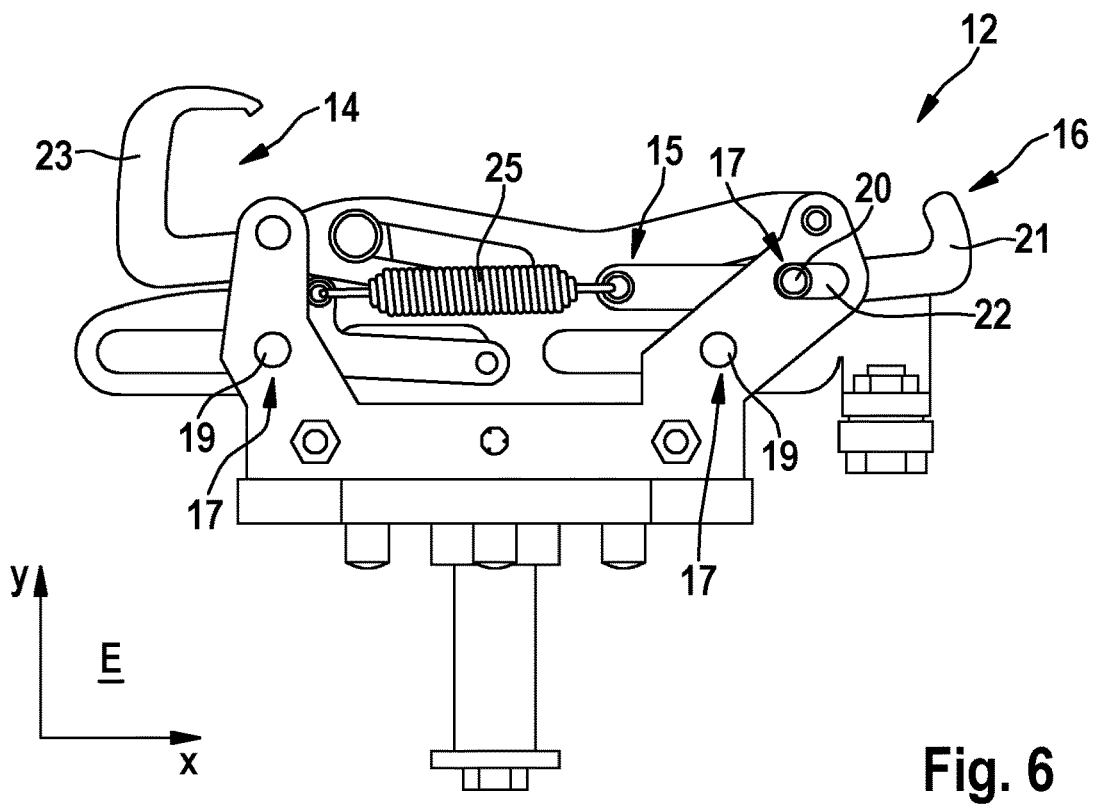
FIG. 6 is a side view of the fastening body.
Figure 7:
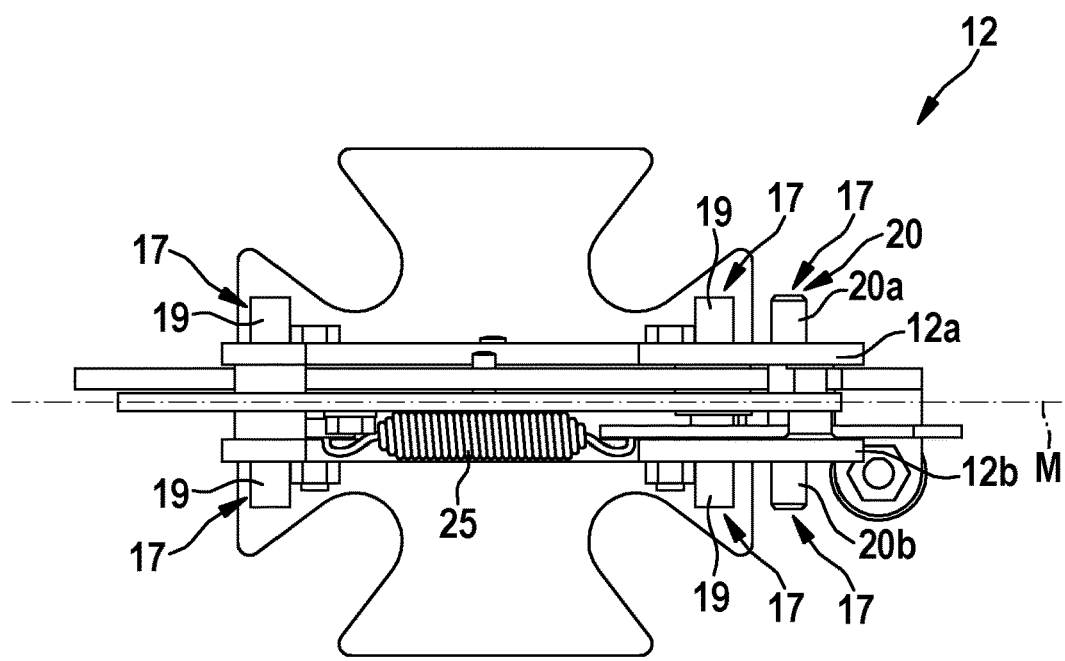
FIG. 7 is a plan view of the fastening body.

The supporting body 11 can optionally be connected to the fastening body 12 by screws or the like as fastening means 15 which are accessible from outside. To that end, the supporting body 11 is mounted on the fastening body 12 from above in the manner of a cap and fixed by means of the fastening means 15. The supporting body 11 and the fastening body 12 define a centre plane E (see in particular FIG. 6, E spanned by the x- and y-axis) which extends parallel to the centre axis M (see in particular FIG. 7) of the holding apparatus 10. Preferably, the supporting body 11 is connected to the fastening body 12 by means of a quick-action locking system 16 which is accessible from outside as the fastening means 15. The quick-action locking system 16 can comprise a gripping and/or clamping and/or latching mechanism or the like.

Preferably, the quick-action locking system 16 comprises bolts 17 on the fastening body 12 on the one hand and recesses 18 on the supporting body 11 on the other hand. The bolts 17 arranged on the fastening body 12 engage, in the mounted state of the supporting body 11 on the fastening body 12, into the recesses 18 on the supporting body 11 in in a positive-locking and/or non-positive locking manner. There can be solely positive-locking contacts, solely non-positive locking contacts, and also combined positive-locking and non-positive locking contacts. Bolt 17 is understood as meaning any type of pin, shaft portion, profile or the like, as long as there is a sufficiently large projection which is configured and adapted to engage into/behind the recesses 18 in the supporting body 11.

In the embodiment shown, at least two supporting bolts 19 are arranged in a stationary manner on the fastening body 12, which supporting bolts 19 each extend on either side of the fastening body 12. The at least one movable guide bolt 20 likewise extends on either side of the fastening body 12. Extension on either side means that free ends of the supporting bolts 19 and of the guide bolt 20 protrude laterally and thus preferably transversely to the centre plane E from the fastening body 12, or side walls 12a, 12b thereof (see in particular FIG. 7). The number of supporting bolts 19 and the positioning thereof can vary. The same is true for the guide bolt 20.

Figure 2:
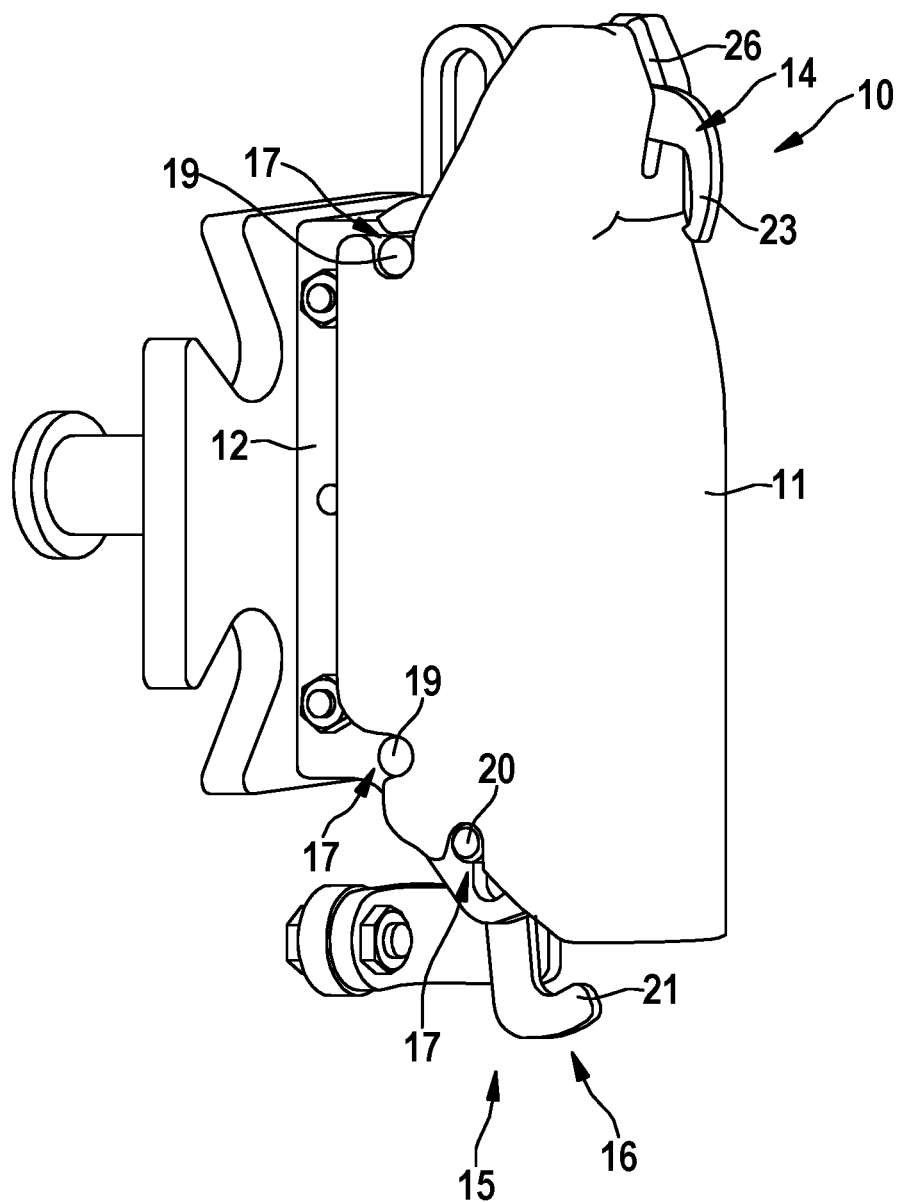
FIG. 2 is a schematic showing the holding apparatus according to FIG. 1 in a first detachment position of the supporting body.
Figure 3:
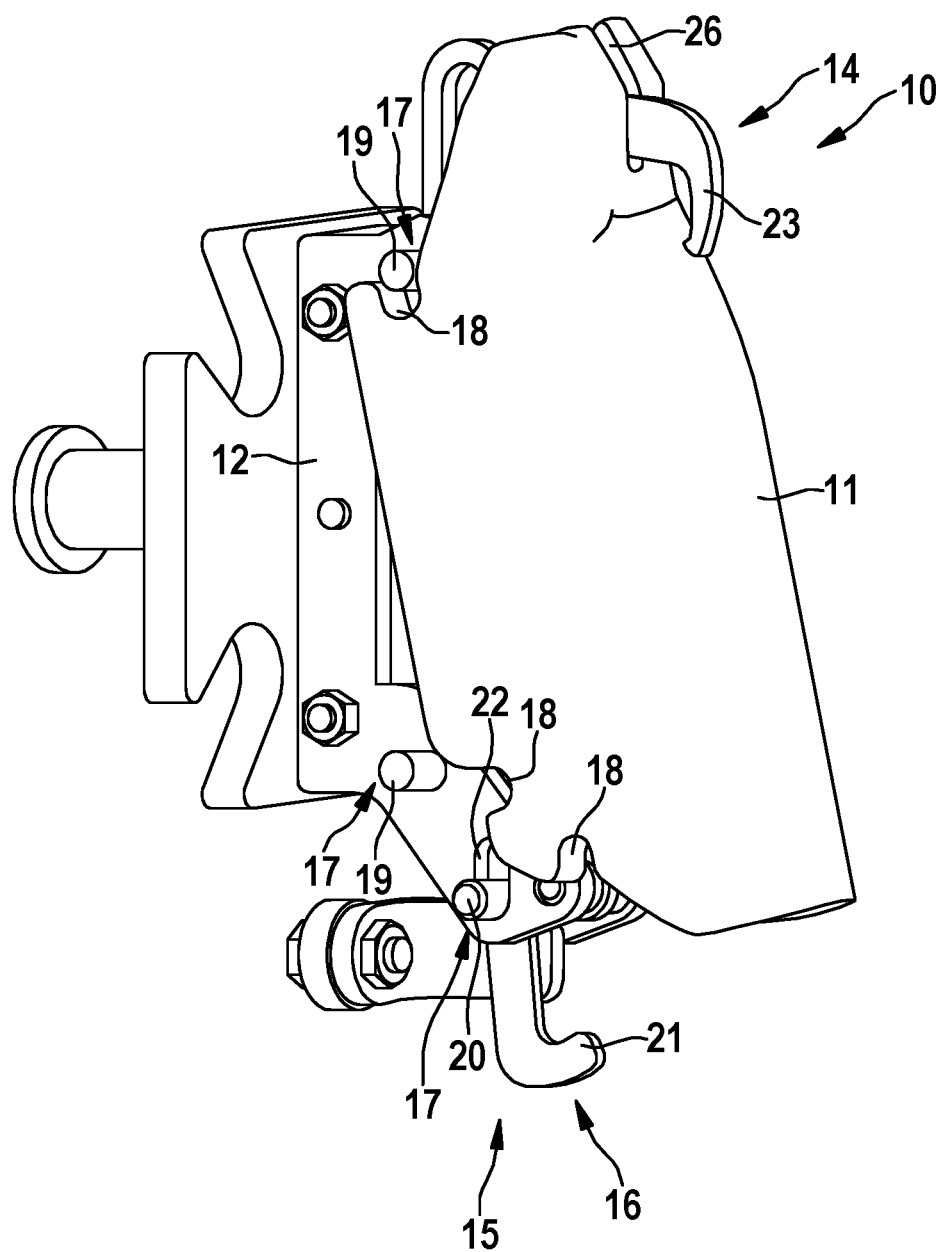
FIG. 3 is a schematic showing the holding apparatus according to FIG. 1 in an advanced detachment position.
Figure 4:
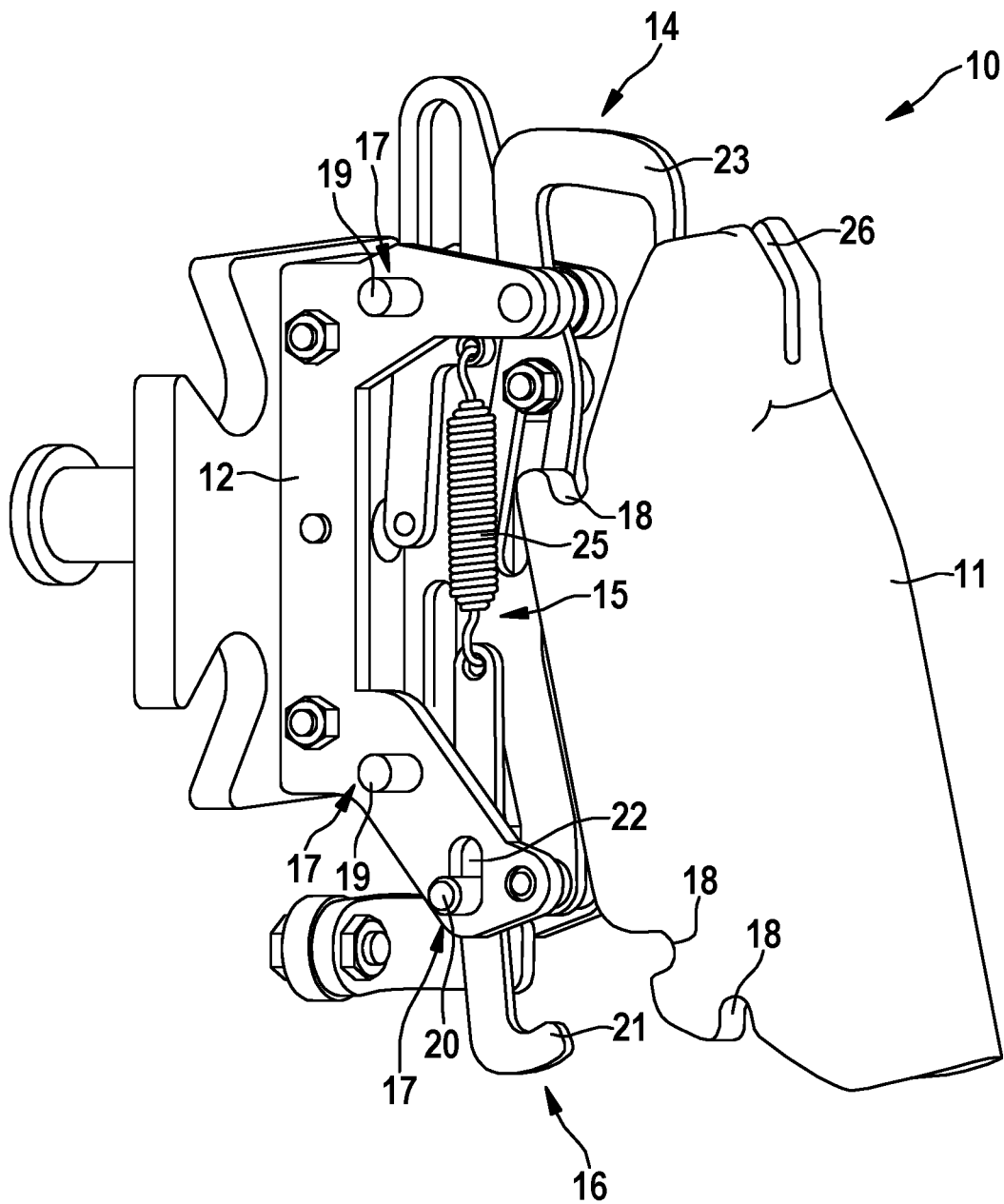
FIG. 4 is a schematic showing the holding apparatus according to FIG. 1 in a further advanced detachment position.
Figure 5:
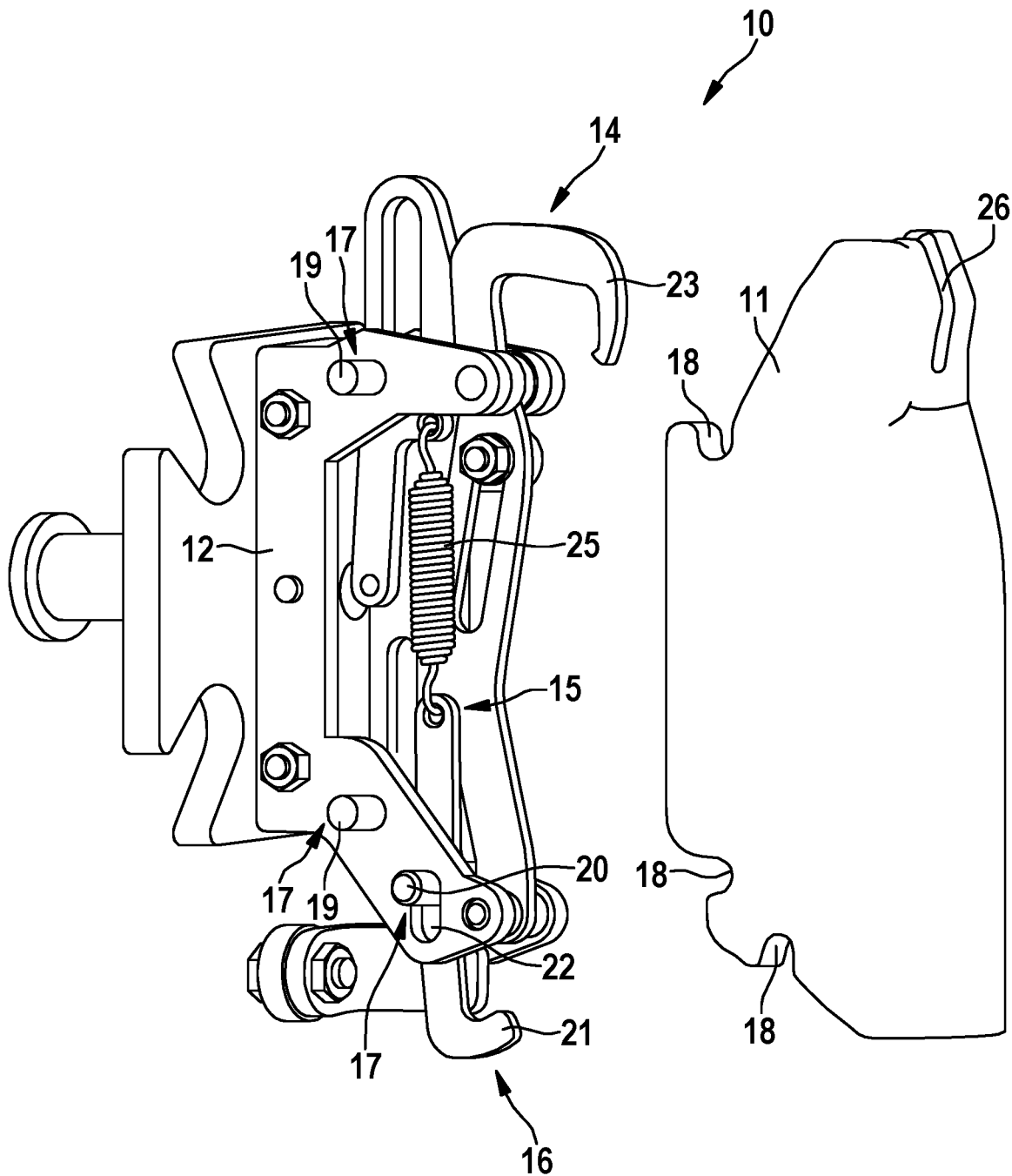
FIG. 5 is a schematic showing the holding apparatus according to FIG. 1 with a supporting body completely detached from the fastening body.

Preferably, the movable guide bolt 20 is arranged on an actuating lever 21, wherein the actuating lever 21 is on the one hand movably mounted on the fastening body 12 and on the other hand is arranged in a spring-loaded manner on the fastening body 12. In the mounted state of the supporting body 11 on the fastening body 12, the actuating lever 21 protrudes from/beneath the supporting body 11, so that permanent access is ensured. A preferred mounting of the actuating lever 21 on the fastening body 12 is achieved in that the movable guide bolt 20 is fixedly connected to the actuating lever 21 and extends on either side of the actuating lever 21, transversely to the centre plane E, wherein the free ends 20a, 20b of the guide bolt 20 are guided in elongated holes 22 in the fastening body 12, or in the side walls 12a, 12b. The spring loading can be generated by a spring element 25. To that end, the spring element 25 is fastened to a free end of the actuating lever 21. The opposite end of the spring element 25 is fastened to the fastening body 12. By means of the spring element 25, a spring bias acts on the actuating lever 21, which holds the actuating lever 21, and thus the guide bolt 20, or the guide bolts 20, in the closed position inside the elongated hole 22 (see e.g. FIG. 1). Preferably, the securing bolts 19 and the guide bolts 20 and also the elongated holes 22 are arranged symmetrically with respect to the centre plane E. The recesses 18 in the supporting body 11 are also correspondingly arranged or formed symmetrically. Asymmetrical arrangements and forms are also possible, however. By actuation of the actuating lever 21, the guide bolt 20 is movable against the spring force of the spring element 25 into a release position (see sequence of FIGS. 2 to 4), so that the or each guide bolt 20 with its free ends 20a, 20b is moved out of the recess 18 or recesses 18 in the supporting body 11 in order to release the supporting body. Other clamping and/or latching and/or coupling mechanisms can of course likewise be used.

The unit formed of the fastening body 12 and the clamping device 14 is preferably made of metal, preferably of stainless steel. Other materials or material combinations can likewise be used, however. The clamping device 14 is part of the fastening body 12 and is connected thereto or arranged thereon. The clamping device 14 can be rigid. Optionally, the clamping device 14 comprises a pivotable lever 23 which is mounted on the fastening body 12 to be pivotable from a release position into a clamping position and back. In the mounted state, the lever 23 engages into a slit-like recess 26 in the supporting body 11. The supporting body 11 is preferably in one-part form and made of plastics material. Further preferably, the supporting body is produced by the injection moulding method, by milling from the solid or by means of 3D printing. Optionally, the supporting body 11 can also be made of other materials and also be produced by other production methods.

Figure 8:
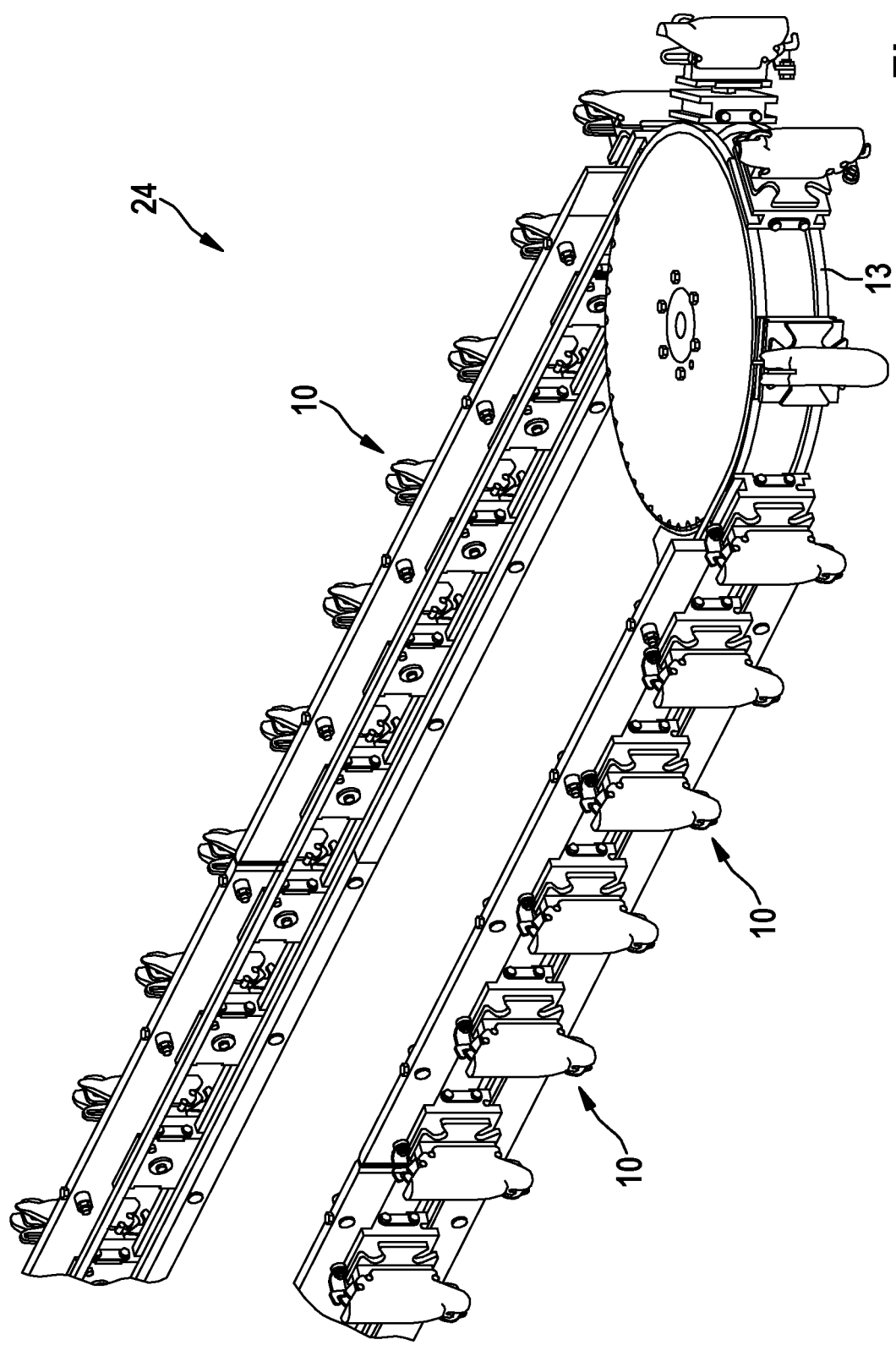
FIG. 8 is a schematic representation of a detail of a transport apparatus in a perspective view.

The holding apparatus 10 can be in the form of a single part, a retrofit kit or a replacement part. Conventionally, however, such holding apparatuses 10 are part of a transport apparatus 24. Transport apparatuses 24 are configured and adapted for transporting poultry breast caps or other poultry parts and comprise a transport unit 13 which is driven in a revolving manner (by means of a drive which is not shown explicitly) and also at least one holding apparatus 10 fastened thereto, which is configured and adapted for holding the eviscerated poultry bodies or parts thereof during processing in an apparatus for processing eviscerated poultry bodies or parts thereof. Conventionally, however, a plurality of holding apparatuses 10 is fastened to the transport unit 13 (see in particular FIG. 8). Preferably, the or each holding apparatus 10 is configured and adapted according to one or more of claims 1 to 8 and thus in accordance with the preceding description. The transport unit 13 is preferably a transport chain to which the holding apparatuses 10 are detachably fastened via their fastening bodies 12.

Such transport apparatuses 24 according to claim 9, as are described hereinbefore, are preferably arranged in an apparatus for processing eviscerated poultry bodies or parts thereof.

Such apparatuses are configured and adapted for processing eviscerated poultry bodies or parts thereof and comprise at least one processing station for processing the poultry bodies or parts thereof, and also a transport apparatus 24 for transporting the poultry bodies or parts thereof along the or each processing station, wherein the transport apparatus 24 is configured and adapted according to claim 9, as described hereinbefore.

The method according to the invention for maintenance of the holding apparatus 10 will be described in the following. Maintenance of the holding apparatus 10 is described by way of example for cleaning of the holding apparatus 10. The method for cleaning a holding apparatus 10 which is configured and adapted for holding eviscerated poultry bodies or parts thereof during processing in an apparatus for processing eviscerated poultry bodies or parts thereof, wherein the holding apparatus 10 comprises a fastening body 12, with which the holding apparatus 10 is fastened to a transport unit 13 of the apparatus for processing, and a supporting body 11 which is detachably arranged on the fastening body 12 and is configured and adapted for supporting poultry bodies or parts thereof, is distinguished according to the invention in that, for maintenance of the holding apparatus 10, only the supporting body 11 is removed from the fastening body 12, while the fastening body 12 remains on the transport unit 13.

Preferably, the supporting body 11 is detached from the fastening body 12 by actuation of a quick-action locking system 16 which, in the mounted state of the holding apparatus 10 on the transport unit 13, is accessible from outside.

Poultry bodies or parts thereof are first processed in the apparatus for processing. To that end, the holding apparatuses 10 run along the processing stations by means of the transport unit 13 and are thereby heavily contaminated. For the purposes of maintenance/cleaning, the apparatus is stopped. The supporting bodies 11 are still fixed to the fastening body 12 in that the supporting bolts 19 and the guide bolts 20 are seated in a positive-locking and/or non-positive locking manner in the recesses 18 of the supporting body 11 (see FIG. 1). One or more operators detach the supporting bodies 11 from the fastening body 12 by means of the quick-action locking system 16, by pushing the actuating lever 21—in the present case—backwards/downwards. In the case of other orientations of the holding apparatus 10, actuation can also take place to the side or upwards. The or each guide bolt 20 is thereby pulled downwards (upwards/to the side) in the elongated hole 22, until the or each guide bolt 20 has moved out of the corresponding recess 18 of the supporting body 11 completely (see FIG. 2). By releasing the supporting body 11 in the region of the guide bolts 20, the supporting body 11 can as it were be lifted from the supporting bolts 19, preferably by a type of tilting movement (see FIGS. 3 and 4). The supporting body 11, which is now completely detached from the fastening body 12, can be placed in a cleaning container or the like and cleaned. The operator merely has to move the lightweight supporting body 11. The heavyweight fastening body 12 remains on the transport unit 13 and can be cleaned in place with the transport unit and together with the clamping device 14. After the holding apparatus 10 has been cleaned, the supporting body 11 can be fitted to the fastening body 12 again, in the reverse order, and fixed by means of the quick-action locking system 16. Instead of cleaning, individual supporting bodies 11 can thus also be replaced or repaired. Repair to the fastening body 12 and/or to the clamping device 14 can also be carried out in a corresponding manner.

The invention claimed is:

1. A holding apparatus, configured and adapted for holding eviscerated poultry bodies or parts thereof during processing in an apparatus for processing eviscerated poultry bodies or parts thereof, comprising:
    a supporting body configured and adapted for supporting the poultry body or parts thereof;
    a fastening body configured and adapted for holding the supporting body on the one hand and for fastening the holding apparatus to a revolving transport unit of the apparatus for processing eviscerated poultry bodies or parts thereof on the other hand;
    a clamping device for fixing the poultry body or parts thereof on the supporting body during processing;
    the supporting body being detachably connected to the fastening body by a fastening element, the fastening element configured and adapted such that, in a mounted state of the holding apparatus on the transport unit, the fastening element is accessible from outside for detaching the supporting body from the fastening body;
    at least one stationary supporting bolt and at least one movable guide bolt are arranged on the fastening body, the supporting body having corresponding recesses into which the stationary supporting bolt and the movable guide bolt engage.

2. The holding apparatus according to claim 1, wherein the fastening element comprises a quick-action locking system for connecting the supporting body to the fastening body.

3. The holding apparatus according to claim 2, wherein the quick-action locking system comprises bolts on the fastening body on the one hand and recesses on the supporting body on the other hand, which bolts and recesses engage into one another in a positive-locking and/or non-positive locking manner.

4. The holding apparatus according to claim 1, wherein:
    the at least one stationary bolt comprises at least two supporting bolts each arranged in a stationary manner on the fastening body, the at least two supporting bolts each extending on two sides of the fastening body; and
    the at least one movable guide bolt extends on the two sides of the fastening body.

5. The holding apparatus according to claim 4, wherein the at least one movable guide bolt is arranged on an actuating lever, the actuating lever on the one hand being movably mounted on the fastening body and on the other hand being arranged in a spring-loaded manner on the fastening body.

6. The holding apparatus according to claim 5, wherein the at least one movable guide bolt is fixedly connected to the actuating lever and extends on either side of the actuating lever, free ends of the at least one guide bolt being guided in elongated holes on the fastening body.

7. The holding apparatus according to claim 1, wherein a unit formed of the fastening body and the clamping device is made of metal.

8. The holding apparatus according to claim 7, wherein the unit formed of the fastening body and the clamping device is made of stainless steel.

9. The holding apparatus according to claim 1, wherein the supporting body is in one-part form and is made of plastics material.

10. A transport apparatus, configured and adapted for transporting eviscerated poultry bodies or parts thereof, comprising:
   a transport unit which is revolvingly driven;
   at least one holding apparatus fastened thereto, the at least one holding apparatus configured and adapted for holding the eviscerated poultry bodies or parts thereof during processing in an apparatus for processing eviscerated poultry bodies or parts thereof;
   the at least one holding apparatus being at least one holding apparatus according to claim 1.

11. An apparatus for processing eviscerated poultry bodies or parts thereof, comprising:
   at least one processing station for processing the poultry bodies or parts thereof;
   a transport apparatus for transporting the poultry bodies or parts thereof along the at least one processing station;
   the transport apparatus being a transport apparatus according to claim 10.

12. A method for the maintenance of a holding apparatus of the type configured and adapted for holding eviscerated poultry bodies or parts thereof during processing in an apparatus for processing eviscerated poultry bodies or parts thereof, comprising:
   providing a holding apparatus comprising a fastening body with which the holding apparatus (10) is fastened to a transport unit of the apparatus for processing, and a supporting body which is detachably arranged on the fastening body and is configured and adapted for supporting poultry bodies or parts thereof;
   removing only the supporting body from the fastening body, while the fastening body remains on the transport unit, for maintenance of the holding apparatus.

13. The method according to claim 12, wherein the supporting body is detached from the fastening body by actuation of a quick-action locking system which, in the mounted state of the holding apparatus on the transport unit, is accessible from outside.

* * * * *